United States Patent
Wilshire

(10) Patent No.: US 8,635,412 B1
(45) Date of Patent: Jan. 21, 2014

(54) INTER-PROCESSOR COMMUNICATION

(75) Inventor: James C. Wilshire, Capistrano Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 239 days.

(21) Appl. No.: 13/167,010

(22) Filed: Jun. 23, 2011

Related U.S. Application Data

(60) Provisional application No. 61/381,378, filed on Sep. 9, 2010.

(51) Int. Cl.
*G06F 12/00* (2006.01)

(52) U.S. Cl.
USPC .... 711/147; 711/118; 711/130; 711/E12.066; 711/E12.067

(58) Field of Classification Search
None
See application file for complete search history.

(56) References Cited

U.S. PATENT DOCUMENTS

| | | | | |
|---|---|---|---|---|
| 4,758,947 A | * | 7/1988 | Levendel et al. | 1/1 |
| 4,819,154 A | * | 4/1989 | Stiffler et al. | 714/20 |
| 5,093,780 A | | 3/1992 | Sunahara | |
| 5,123,094 A | | 6/1992 | MacDougall | |
| 5,191,649 A | * | 3/1993 | Cadambi et al. | 709/225 |
| 5,450,565 A | * | 9/1995 | Nadir et al. | 711/128 |
| 5,548,728 A | * | 8/1996 | Danknick | 709/213 |
| 5,634,099 A | | 5/1997 | Andrews et al. | |
| 5,860,092 A | * | 1/1999 | Breid et al. | 711/118 |
| 5,870,572 A | | 2/1999 | Garcia | |
| 5,895,487 A | * | 4/1999 | Boyd et al. | 711/122 |
| 6,049,847 A | * | 4/2000 | Vogt et al. | 710/309 |
| 6,223,271 B1 | * | 4/2001 | Cepulis | 711/206 |
| 6,338,122 B1 | | 1/2002 | Baumgartner et al. | |
| 6,381,682 B2 | * | 4/2002 | Noel et al. | 711/153 |
| 6,393,536 B1 | * | 5/2002 | Hughes et al. | 711/159 |
| 6,430,654 B1 | * | 8/2002 | Mehrotra et al. | 711/118 |
| 6,574,708 B2 | * | 6/2003 | Hayter et al. | 711/118 |
| 6,591,340 B2 | * | 7/2003 | Chopra et al. | 711/118 |
| 6,622,211 B2 | * | 9/2003 | Henry et al. | 711/128 |
| 6,678,801 B1 | | 1/2004 | Greim et al. | |
| 6,865,651 B2 | * | 3/2005 | Woodward | 711/147 |
| 6,924,811 B1 | * | 8/2005 | Minkin | 345/552 |
| 7,082,494 B1 | | 7/2006 | Thelin et al. | |

(Continued)

FOREIGN PATENT DOCUMENTS

EP 710906 A1 * 5/1996

OTHER PUBLICATIONS

Gene Cooperman, "Cache Basics", Jun. 27, 2003, pp. 1-2, http://web.archive.org/web/20030627070402/http://www.ccs.neu.edu/course/com3200/parent/NOTES/cache-basics.html.*

*Primary Examiner* — Edward Dudek, Jr.
*Assistant Examiner* — Christopher Birkhimer

(57) ABSTRACT

A multi-processor system is disclosed comprising a first processor, a first memory coupled to the first processor, a second processor, and a shared memory subsystem including a shared memory and a data transfer unit. The first processor is configured to build a data structure in the first memory and to send a direct memory access (DMA) transfer request to the data transfer unit of the shared memory subsystem, the DMA transfer request including an address of the data structure in the first memory. The data transfer unit is configured to retrieve the data structure from the first memory based on the DMA transfer request, to store the data structure in the shared memory, and to send a shared memory pointer to the second processor indicating an address of the data structure in the shared memory.

24 Claims, 6 Drawing Sheets

(56) References Cited

U.S. PATENT DOCUMENTS

| | | |
|---|---|---|
| 7,114,041 B2 | 9/2006 | Hammitt et al. |
| 7,174,467 B1 | 2/2007 | Helms et al. |
| 7,188,229 B2 * | 3/2007 | Lowe .......................... 711/207 |
| 7,222,217 B2 * | 5/2007 | Gray .......................... 711/118 |
| 7,240,182 B2 * | 7/2007 | Day et al. .................... 712/34 |
| 7,310,699 B2 | 12/2007 | Sinclair |
| 7,313,641 B2 | 12/2007 | Koch et al. |
| 7,340,580 B2 | 3/2008 | Kinoshita |
| 7,363,396 B2 | 4/2008 | Liu et al. |
| 7,424,587 B2 | 9/2008 | Caulkins et al. |
| 7,441,054 B2 | 10/2008 | Wu et al. |
| 7,457,903 B2 | 11/2008 | Purdham et al. |
| 7,493,452 B2 * | 2/2009 | Eichenberger et al. ....... 711/137 |
| 7,577,795 B2 * | 8/2009 | Hutton et al. ................ 711/141 |
| 2002/0083111 A1 | 6/2002 | Row et al. |
| 2004/0039880 A1 * | 2/2004 | Pentkovski et al. ........... 711/146 |
| 2004/0193743 A1 | 9/2004 | Byers et al. |
| 2005/0055496 A1 * | 3/2005 | Nallapa ....................... 711/103 |
| 2005/0193081 A1 | 9/2005 | Gruber et al. |
| 2008/0126662 A1 * | 5/2008 | Rajbharti ..................... 710/308 |
| 2008/0235443 A1 | 9/2008 | Chow et al. |
| 2009/0017220 A1 | 1/2009 | Muller et al. |
| 2009/0070502 A1 | 3/2009 | Noha et al. |
| 2009/0116475 A1 | 5/2009 | Krzyzanowski et al. |
| 2009/0119460 A1 * | 5/2009 | Lin et al. ..................... 711/138 |
| 2009/0172260 A1 | 7/2009 | Olbrich et al. |
| 2010/0076944 A1 * | 3/2010 | Kamat ......................... 707/705 |

* cited by examiner

INTER-PROCESSOR COMMUNICATION

CROSS-REFERENCE TO RELATED APPLICATIONS

The present application claims priority from provisional U.S. Patent Application Ser. No. 61/381,378, filed on Sep. 9, 2010, the specification of which is incorporated herein by reference.

BACKGROUND

In a multi-processor system, a data structure may be processed by two or more processors, in which a processor processes the data structure and passes the data structure to another processor for further processing by the other processor. The data structure may be communicated between the processors by a shared memory.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
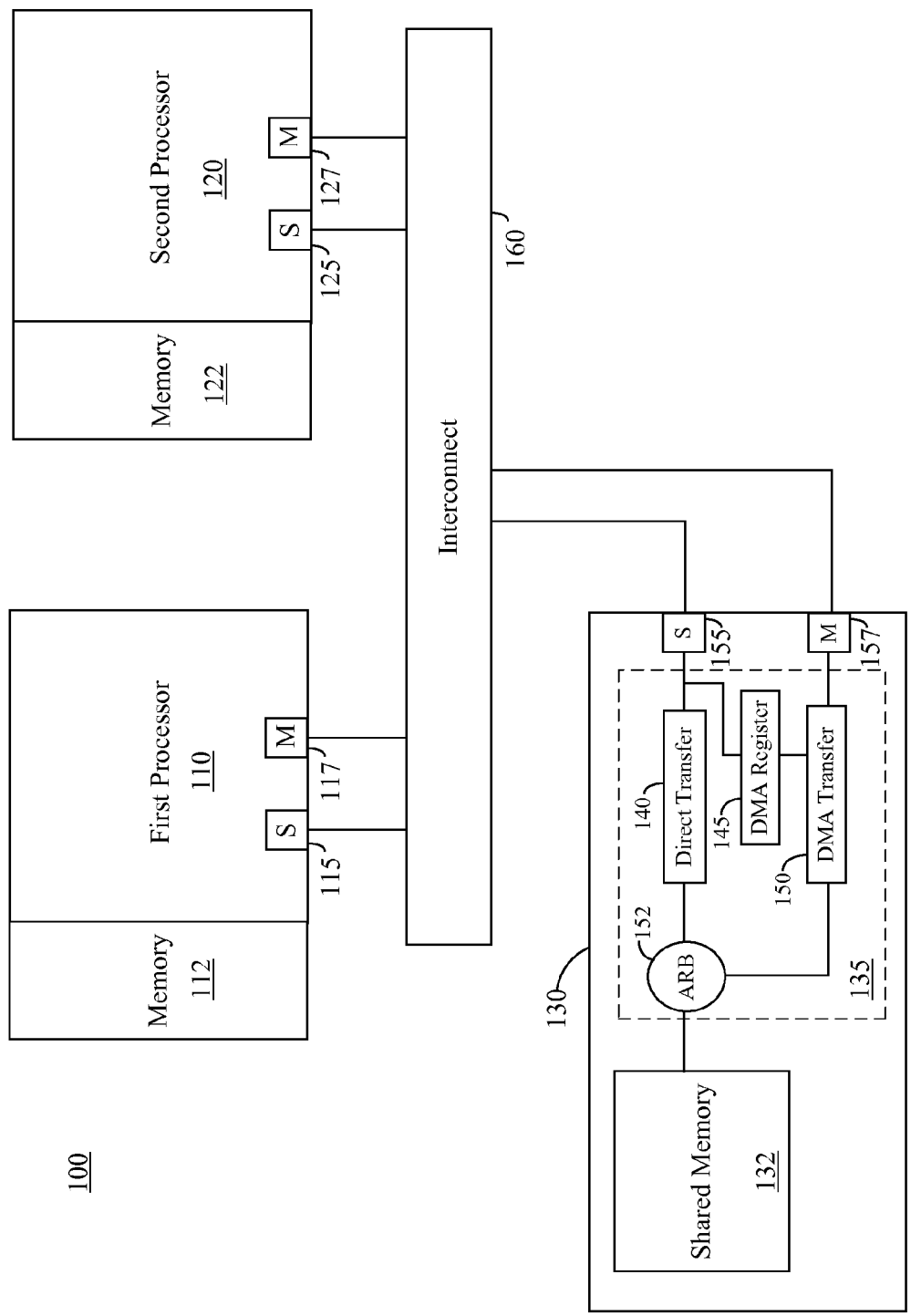
FIG. 1 is a block diagram of a multi-processor system with inter-processor communication according to an embodiment of the present invention.

FIG. 1 shows a multi-processor system 100 including a first processor 110, a second processor 120, and a shared memory subsystem 130 according to an embodiment of the present invention. The system 100 provides inter-processor communication between the first processor 110 and the second processor 120, in which a data structure generated by the first processor 110 can be passed to the second processor 120 through the shared memory subsystem 130 for further processing of the data structure by the second processor 120, as discussed further below. Each processor 110 and 120 may be implemented using an ARM processor core or other type of processor.

The system 100 further includes a first memory 112 coupled to the first processor 110 and a second memory 122 coupled to the second processor 120. Each memory 112 and 122 may comprise a tightly coupled memory (TCM) that is tightly coupled to the respective processor 110 and 120, providing the respective processor 110 and 120 with high-speed access to the memory 112 and 122.

The shared memory subsystem 130 comprises a shared memory 132 (e.g., static random access memory (SRAM)) and a data transfer unit 135 configure to transfer data to and from the shared memory 132. The shared memory 132 may be used to store data structures that are passed between the processors 110 and 120, as discussed further below.

The data transfer unit 135 may include a direct transfer unit 140, a direct memory access (DMA) transfer unit 150, a DMA register 145, and an arbitrator 152. The direct transfer unit 140 is configured to allow the processors 110 and 120 to directly access the shared memory 132 via a slave port 155 of the shared memory subsystem 130, as discussed further below. The DMA transfer unit 150 is configured to retrieve a DMA transfer request from the DMA register 145 and to transfer data between one of the memories 112 and 122 and the shared memory 132 through a master port 157 based on the DMA transfer request, as discussed further below. The arbitrator 152 arbitrates access to the shared memory 132 between the direct transfer unit 140 and the DMA transfer unit 150.

The system 100 also includes an interconnect 160 between the processors 110 and 120 and the shared memory subsystem 130. The interconnect 160 may support communication between the processors 110 and 120 and the shared memory subsystem 130 based on an Advanced eXtensible Interface (AXI) standard or other interface standard. In one embodiment, the first processor 110 may be coupled to the interconnect 160 via a slave port 115 and a master port 117. The slave port 115 allows the second processor 120 and the shared memory subsystem 130 to directly access the first memory 112 through their respective master ports 127 and 157. Similarly, the second processor 120 may be coupled to the interconnect 160 via a slave port 125 and a master port 127. The slave port 125 allows the first processor 110 and the shared memory subsystem 130 to directly access the second memory 122 through their respective master ports 117 and 157. For example, each processor 110 and 120 may be implemented using an ARM Cortex™ R4 processor with an AXI slave port that provides external processors with access to a TCM of the processor.

Operations of the multi-processor system 100 for providing inter-processor communication will now be described according to embodiments of the present invention.

In one embodiment, the first processor 110 builds a data structure in the first memory 112. For example, the data structure may comprise a plurality of fields, where each field may correspond to a space in the data structure that is allocated for a specific type of data and is at a known relative position within the data structure. In this example, the processor 110 may build the data structure in the first memory 112 and fill certain fields in the data structure. The first processor 110 may leave other fields in the data structure empty to be subsequently filled by the second processor 120, as discussed further below. In one embodiment, the first memory 112 is tightly coupled to the first processor 110 giving the first processor 100 fast access to the first memory 112. This allows the first processor 110 to quickly build the data structure in the first memory 112 and fill certain fields in the data structure.

After the data structure 110 is built in the first memory 112 and ready for further processing by the second processor 120, the first processor 110 may generate a direct access memory (DMA) transfer request specifying a DMA transfer of the data structure from the first memory 110 to the shared memory 132. The DMA transfer request may include the address of the data structure in the first memory 112. Examples of other information that may be included in the DMA transfer request are discussed below. The first processor 110 may then send the DMA transfer request to the DMA register 145 of the shared memory subsystem 130 via the slave port 155 of the shared memory subsystem 130.

The DMA transfer unit 150 then reads the DMA transfer request from the DMA register 145 and transfers the data structure from the first memory 112 to the shared memory 132 via the slave port 115 of the first processor 110 and the master port 157 of the shared memory subsystem 130 based on the DMA transfer request. As discussed above, the DMA transfer request may include the address of the data structure in the first memory 112, allowing the DMA transfer unit 150 to locate the data structure in the first memory 112. The DMA transfer unit 150 may store the data structure at a certain address in the shared memory 132. In one embodiment, the first processor 110 may specify the address in the shared memory 132 at which the data structure is stored, as discussed further below. Alternatively, the DMA transfer unit 150 may determine the address in the shared memory 132.

While the DMA transfer unit 150 transfers the data structure from the first memory 112 to the shared memory 132, the first processor 110 may build another data structure in a different area of the first memory 112 to be transferred next to the shared memory 132. Thus, the DMA transfer unit 150 may transfer the data structure from the first memory 112 to the shared memory 132 concurrently with the first processor 110 building the next data structure.

After the data structure is stored in the shared memory 132, the DMA transfer unit 150 may send a shared memory pointer to the second processor 120 indicating the address of the data structure in the shared memory 132. The DMA transfer unit 150 may do this by writing the shared memory pointer in the second memory 122 via the slave port 125 of the second processor 120. Thus, the shared memory pointer provides the second processor 120 with the address of the data structure in the shared memory 132. The shared memory pointer may also inform the second processor 120 that a data structure is in the shared memory 132 for the second processor 120.

The DMA transfer unit 150 may also send a done status to the first processor 110 informing the first processor 110 that the data structure has been successfully transferred to the shared memory 132. After receiving the done status, the first processor 110 may send a DMA transfer request for the next data structure to the DMA register 145.

After the shared memory pointer is received in the second memory 122, the second processor 120 may retrieve the data structure from the shared memory 132 and update the data structure. For example, the second processor 120 may read the data structure from the shared memory 132 via the direct transfer unit 140 of the shared memory subsystem 130, and store the read data structure in the second memory 122. The second processor 120 may locate the data structure in the shared memory 132 based on the shared memory pointer. The second processor 120 may then update the data structure in the second memory 122, e.g., by filing certain fields in the data structure.

After the data structure has been updated in the second memory 122, the second processor 120 may write the update to the shared memory 132 via the direct transfer unit 140. The second processor 120 may do this by writing the entire updated data structure from the second memory 122 to the shared memory 132 at the address specified by the shared memory pointer. Alternatively, the second processor 120 may only write the portion of the data structure updated by the second processor 120 (e.g., the fields updated by the second processor 120) to the shared memory 132. The second processor 120 may determine the locations of the updated fields in the shared memory 132 based on the shared memory address specified by the shared memory pointer and the known relative positions of the fields within the data structure. In this embodiment, the second processor 120 may read only a portion of the data structure from the shared memory 132 that is needed by the second processor 120 to determine the data that goes into the fields updated by the second processor 120.

Thus, both processors 110 and 120 may insert data into the data structure. The first processor 110 may build the data structure and fill certain fields in the data structure. The data structure may then be passed to the second processor 120 via the shared memory subsystem 130 for further processing by the second processor 120. The second processor 120 may process the data structure by filling other fields in the data structure. Thus, each processor 110 and 120 may be responsible for performing different tasks in the system 100 associated with different fields in the data structure. The above operations may be repeated for each data structure processed by the first and second processors 110 and 120.

An advantage of the system 100 according to an embodiment of the present invention is that it reduces the amount of time that the first processor 110 needs to spend on each data structure, freeing up the first processor 110 to perform other operations. This is because the DMA transfer unit 150 of the shared memory subsystem 130 handles the transfer of the data structure from the first memory 112 to the shared memory 132 and automatically notifies the second processor 120 when the data structure in the shared memory 132 is ready for the second processor 120 (e.g., by sending the shared memory pointer to the second processor 120). As a result, the first processor 110 does not need to monitor the data transfer to determine when the data transfer is complete and inform the second processor 120 that the data structure is ready for the second processor 120.

In one embodiment, the first processor 110 may specify the address of the data structure in the shared memory 132 by writing the corresponding DMA transfer request to an address that is equal to the desired address of the data structure in the shared memory 132 plus a predetermined address offset. For example, a DMA transfer request may be written to an address within an address range of 10000 through 1FFFF, a data structure may be written to an address in the shared memory 132 within an address range of 0000 through FFFF, and the address offset may be 10000. In this example, when the first processor 110 writes a DMA transfer request to an address within the address range 10000 through 1FFFF, the DMA transfer request is written to the DMA register 145 and the DMA transfer unit 150 transfers the corresponding data structure to an address in the shared memory 132 equal to the address of the DMA transfer request minus the address offset of 10000. For example, if the first processor 110 desires that a data structure be transferred to address 40 in the shared memory 132, then the first processor 110 writes the corresponding DMA transfer request to address 10040, which is equal to the address 40 plus the address offset of 10000. In this embodiment, the address in the shared memory 132 may correspond to the address where the data structure begins in the shared memory 132. Thus, the first processor 110 may define the address of the data structure in the shared memory 132, and thus the shared memory pointer, by writing the DMA transfer request to an address equal to the desired address of the data structure in the shared memory 132 plus a predetermined address offset.

Figure 2:
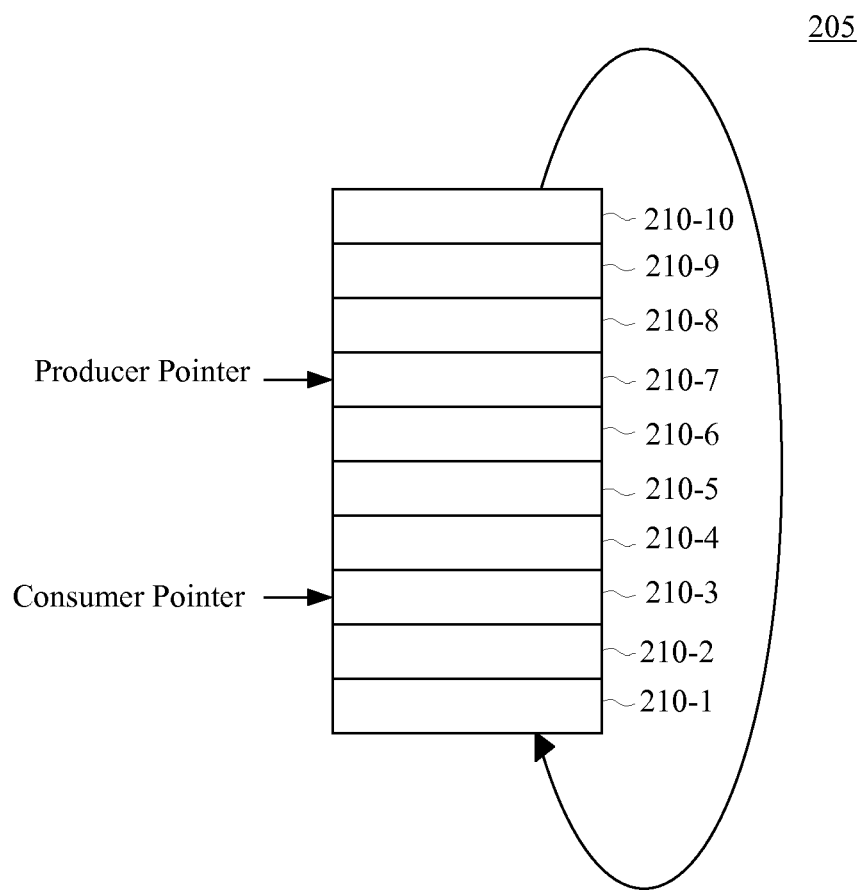
FIG. 2 shows an example of an area of memory for storing shared memory pointers according to an embodiment of the present invention.

In one embodiment, an area in the second memory 122 may be reserved for storing shared memory pointers from the shared memory subsystem 130. FIG. 2 shows an example of an area 205 in the second memory 122 comprising a plurality of slots 210-1 to 210-10 for storing shared memory pointers from the shared memory subsystem 130. The slots 210-1 to 210-10 may correspond to a range of addresses in the second memory 122, in which the address of each slot may be specified by a different address offset from a base address. In the example shown in FIG. 2, slot 201-1 may correspond to the base address, and the address of each of the other slots 210-2 to 210-10 may be specified by a different address offset from the base address. Thus, each of the slots 210-2 to 210-10 in the second memory 122 may be specified by a different offset from a base slot (slot 201-1). Although the example in FIG. 2 shows ten slots, those skilled in the art will appreciate that the second memory 122 may have any number of slots for receiving shared memory pointers.

In this embodiment, the first processor 110 may keep track of which slot in the second memory 122 the shared memory pointer for the latest data structure will be written. For example, the shared memory pointers may be written sequentially in the slots 210-1 to 210-10 by the shared memory subsystem 130 starting at slot 210-1. In this example, if five data structures have already been transferred to the shared memory 132 for processing by the second processor 120, then the first processor 110 may determine that the shared memory pointer for the latest data structure will be written in slot 210-6 in the second memory 122.

In one embodiment, the slots 210-1 to 210-10 may be cycled through each time slot 210-10 is reached. For example, after a shared memory pointer is written in slot 210-10, the next shared memory pointer may be written in slot 210-1, overwriting the old shared memory pointer in slot 210-1 (depicted as a circular arrow from slot 210-10 to slot 201-1 in FIG. 2). This assumes that by the time the old shared memory address is overwritten, the second processor 120 has already processed the data structure corresponding to the old shared address pointer. In this embodiment, the first processor 112 may know the number of slots 210-1 to 210-10 in the second memory 122 and use this knowledge in determining the slot for the next shared memory pointer. In this example, if ten data structures have already been transferred to the shared memory 132 for further processing by the second processor 120, then the first processor 110 may determine that the next shared memory pointer will be written in slot 210-1 in the second memory 122.

In one embodiment, when a data structure in the first memory 112 is ready to be transferred to the shared memory 130 for further processing by the second processor 120, the first processor 110 may determine in which slot in the second memory 122 the corresponding shared memory pointer will be written, as discussed above. The first processor 112 may then include a pointer in the DMA transfer request specifying the slot in which the corresponding shared memory access pointer is to be written. The slot may be specified by an offset of the slot from a base slot (e.g., slot 201-1), as discussed above. When the DMA transfer unit 150 executes the DMA transfer request, the DMA transfer unit 150 may write the corresponding shared memory pointer in the slot 210-1 to 210-10 in the second memory 122 specified by the DMA transfer request.

As shared memory pointers are written in the second memory 122 by the shared memory subsystem 130, the second processor 120 may process the corresponding data structures in the order in which the shared memory pointers are received. For each shared memory pointer, the second processor 120 may retrieve the corresponding data structure from the address in the shared memory 132 specified by the shared memory pointer, update the data structure (e.g., update certain fields in the data structure) and write the update (e.g., updated fields) to the shared memory 132, as discussed above.

In one embodiment, the first processor 110 may maintain a producer pointer in the first memory 112 pointing to the slot 210-1 to 210-10 in the second memory 122 that corresponds to the shared memory pointer for the latest data structure produced by the first processor 110. The first processor 110 may update the processor pointer each time a data structure is transferred to the shared memory 132 for further processing by the second processor 120. FIG. 2 shows an example of the producer pointer at slot 210-7. The producer pointer may point to a particular slot by specifying an offset of the slot from a base slot (e.g., slot 210-1).

In this embodiment, a copy of the producer pointer may also be maintained in the second memory 122. The second processor 120 may maintain the local copy of the producer pointer by periodically reading the producer pointer in the first memory 112 via the slave port 115 of the first processor 110. Alternatively, the first processor 110 may write the producer pointer to the second memory 122 via the slave port 125 of the second processor 120 each time the producer pointer is updated. The second processor 120 may check the producer pointer in the second memory 122 to determine how many data structures have been produced by the first processor 110. For example, the second processor 120 may determine that a shared memory pointer for a new data structure has arrived in the second memory 122 when the producer pointer is updated.

In one embodiment, the second processor 120 may maintain a consumer pointer in the second memory 122 pointing to the slot 210-1 to 210-10 in the second memory 122 that corresponds to the shared memory pointer for the last data structure processed by (i.e., consumed by) the second processor 120. The consumer pointer may point to a particular slot by specifying an offset of the slot from a base slot (e.g., slot 210-1). The second processor 110 may update the consumer pointer each the second processor 110 processes a data structure. FIG. 2 shows an example of the consumer pointer at slot 210-3. The slots between the producer pointer and the consumer pointer may correspond to the shared memory pointers for data structures that are awaiting processing by the second processor 120 (i.e., data structures that have been produced by the first processor 110 and are awaiting consumption by the second processor 120). In the example in FIG. 2, the shared memory pointers in slots 210-4 to 210-7 are for data structures awaiting processing by the second processor 120. The remaining slots are available to receive shared memory pointers for new data structures. The remaining slots may be empty and/or contain shared memory pointers for data structures that have already been processed by (i.e., consumed by) the second processor 120.

In one embodiment, the first processor 110 may maintain a copy of the consumer pointer in the first memory 112. In this embodiment, the second processor 120 may update the consumer pointer in the first memory 112 via the slave port 115 of the first processor 110 each time the second processor 120 processes a data structure. Each time the first processor 110 completes a new data structure for transfer to the shared memory 132, the first processor 110 may check the consumer pointer in the first memory 112 to determine whether there are slots in the second memory 122 available to receive the shared memory pointer for the new data structure. If the number of slots between the producer pointer and the consumer pointer reach the maximum number of slots in the second memory 122, then the first processor 110 may determine that there are no available slots in the second memory 122. In this case, the first processor 110 may hold the transfer of the new data structure from the first memory 112 to the shared memory 132 until a slot becomes available for the corresponding shared memory pointer. This may occur when the consumer pointer is updated indicating that the second processor has finished processing (i.e., consuming) a data structure, freeing up a slot in the second memory 122 to receive the shared memory pointer for the new data structure.

Figure 3:
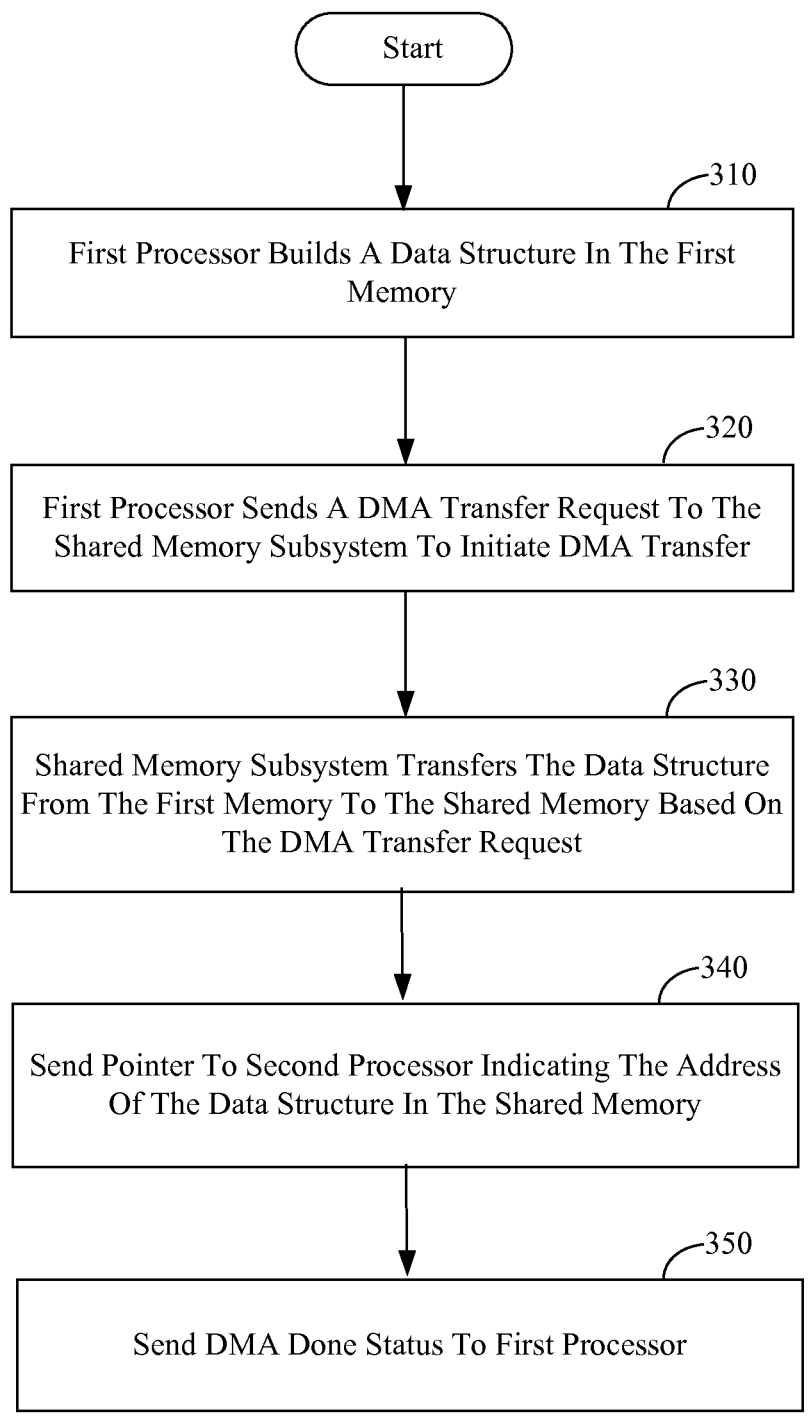
FIG. 3 is a flow diagram showing a method of inter-processor communication according to an embodiment of the present invention.

FIG. 3 is a block diagram of a method for inter-process communication according to an embodiment of the present invention. The method may be performed by the first processor 110 and the shared memory subsystem 130.

In step 310, the first processor 110 builds a data structure in the first memory 112. The first processor 110 may also fill certain fields in the data structure.

In step 320, the first processor 110 sends a DMA transfer request to the shared memory subsystem 130 to initiate a DMA transfer of the data structure from the first memory 112 to the shared memory 132. The first processor 110 may also update the producer pointer accordingly. The DMA transfer request may include the address of the data structure in the first memory 112 and a pointer indicating which slot 210-1 to 210-10 in the second memory 122 to write the corresponding shared memory pointer. As discussed above, the slot may be specified by an offset of the slot from a base slot (e.g., slot 210-1).

Before sending the DMA transfer request, the first processor 110 may check whether the first processor 110 received a done status from the shared memory subsystem 130 for a previous data structure. If the done status has been received, then the first processor 110 may proceed with sending the DMA transfer request. Otherwise, the first processor 110 may wait unit the done status is received for the previous data structure.

Before sending the DMA transfer request, the first processor 110 may also check the consumer pointer in the first memory 112 to determine whether there is a slot 210-1 to 210-10 in the second memory 122 available to receive the shared memory pointer for the data structure, as discussed above. If there is an available slot, then the first processor 110 may proceed with sending the DMA transfer request. Otherwise, the first processor 110 may wait until a slot becomes available.

In step 330, the data transfer unit 150 transfers the data structure from the first memory 112 to the shared memory 132 based on the DMA transfer request.

In step 340, the DMA transfer unit 150 sends a shared memory pointer to the second processor 120 indicating the address of the data structure in the shared memory 132. The DMA transfer unit 150 may do this by writing the shared memory pointer in the second memory 122 in the slot 210-1 to 210-10 specified in the DMA transfer request.

In step 350, the DMA transfer unit 150 sends a done status to the first processor 350 indicating that the data structure has been transferred to the shared memory 132. Upon receiving the done status, the first processor may send the DMA transfer unit 150 another DMA transfer request for the next data structure.

Figure 4:
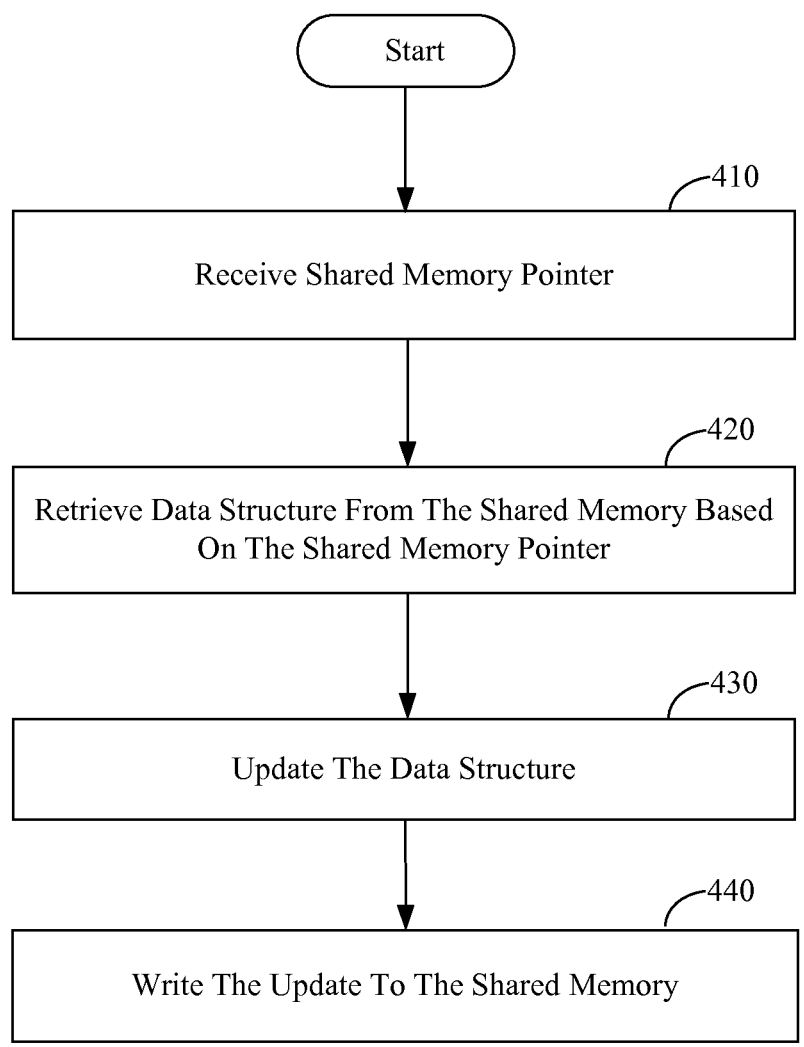
FIG. 4 is a flow diagram showing a method of updating a data structure in shared memory according to an embodiment of the present invention.

FIG. 4 shows a block diagram of a method for updating the data structure in the shared memory 132 according to an embodiment of the present invention.

In step 410, a shared memory pointer is received in the second memory 122. The second processor 120 may poll the producer pointer to determine whether a shared memory pointer for a new data structure has arrived. Alternatively, the first processor 110 and/or the shared memory subsystem 130 may send an interrupt to the second processor 120 indicating that a new data structure has arrived.

In step 420, the second processor 120 retrieves the data structure from the shared memory 132 based on the shared memory pointer. The second processor 120 may do this by reading the data structure from the shared memory address specified by the shared memory pointer, and writing the read data structure in the second memory 122.

In step 430, the second processor 120 updates the data structure. The second processor 120 may do this by filing certain fields in the data structure.

In step 440, the second processor 120 writes the update to the shared memory 440. The second processor 120 may write the entire updated data structure to the shared memory or write only the portion of the data structure updated by the second processor 120 (e.g., updated fields), as discussed above.

When the second processor 120 updates the data structure, the second processor may update the consumer pointer in the second memory 122 accordingly. The second processor 120 may also update the consumer pointer in the first memory 112 by writing the updated consumer pointer in the first memory 112 via the slave port 115 of the first processor 110.

Embodiments of the present invention may be used in any application in which a data structure is processed by multiple processors. For example, embodiments of the present invention may be used to process media access command structures in a data storage device.

Figure 5:
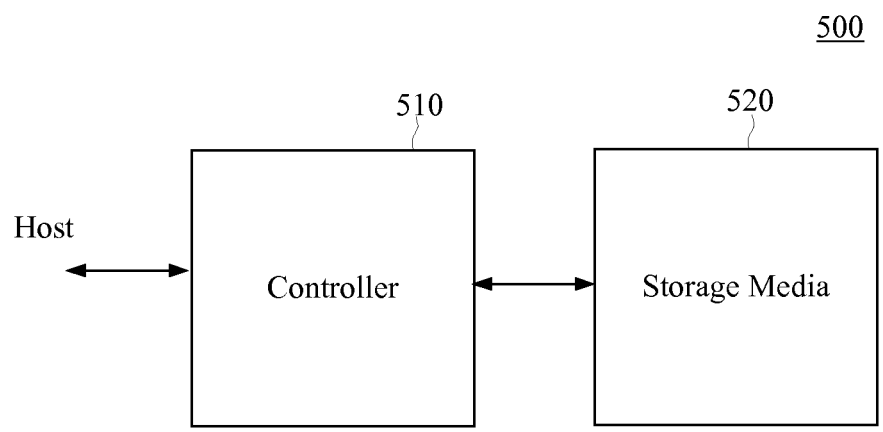
FIG. 5 is a block diagram of a storage device according to an embodiment of the present invention.

FIG. 5 shows a data storage device 500 according to an embodiment of the present invention. The data storage device 500 comprises a storage media 520 and a controller 510. The storage media 520 may include one or more disks, non-volatile semiconductor memory, or other type of storage media. The data storage device 500 may also be a hybrid drive including two or more different types of storage media (e.g., a hybrid drive including a disk and a non-volatile semiconductor memory). The controller 510 is configured to write data to and read data from the storage media 520 based on write/read commands from a host, which uses the data storage device 500 to store data. The controller 510 may interface with the host according to a serial advanced technology attachment (SATA) or other interface standard.

The host may address data in write/read commands to the data storage device 500 using logical block addresses (LBAs). The controller 510 may maintain an address table mapping the LBAs from the host to physical addresses (e.g., physical block addresses) of the corresponding data in the storage media 520. When the controller 510 receives a read command from the host requesting data at certain LBAs, the controller 510 uses the address table to determine the physical addresses of the requested data in the storage media 520. The controller 510 reads the requested data from the physical addresses in the storage media 520 and sends the read data to the host. The use of LBAs allows the host to address data stored in the data storage device 500 without having to know the physical addresses of the data in the storage media 520.

Figure 6:
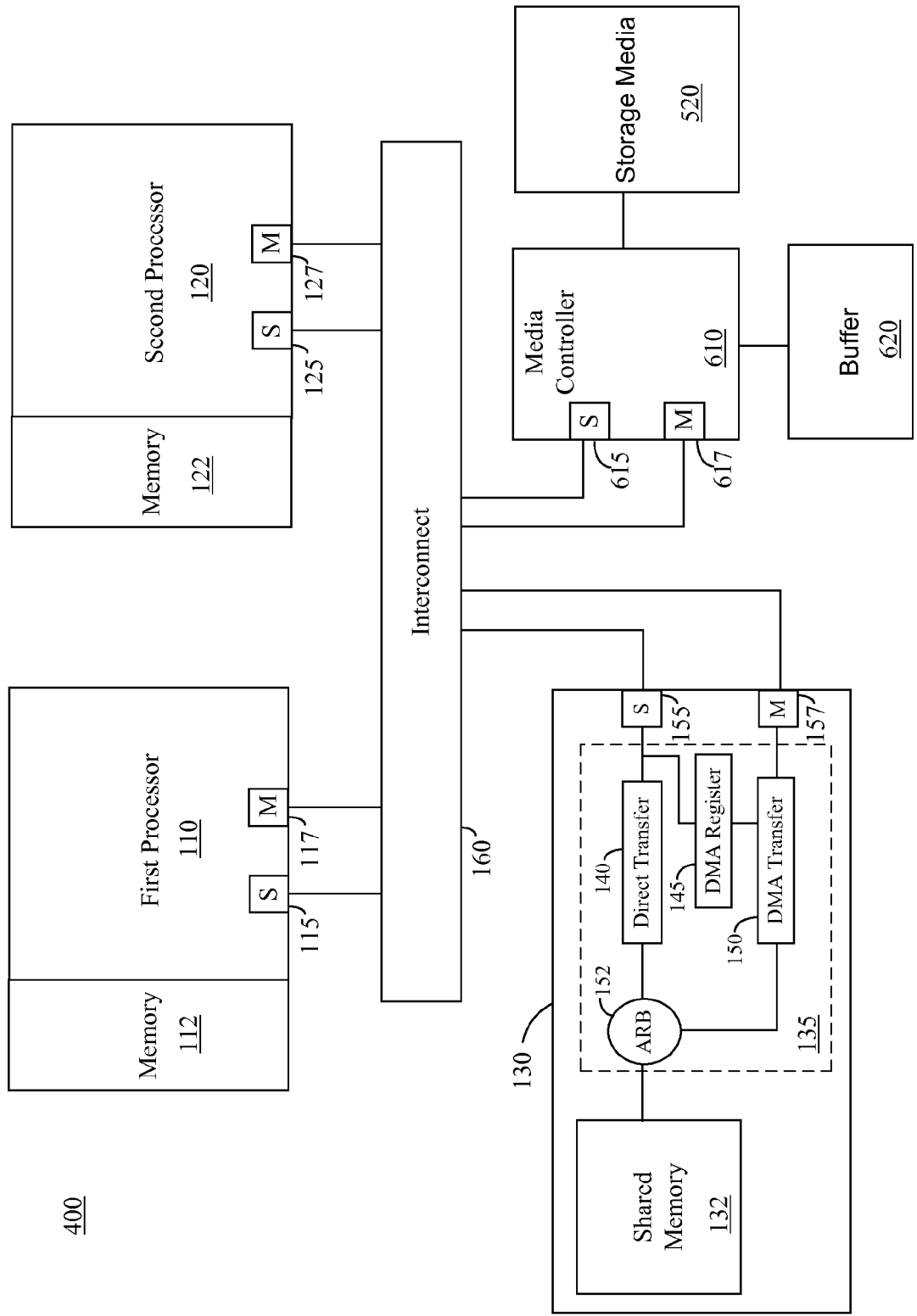
FIG. 6 is a block diagram of a multi-processor system that may be implemented in the storage device according to an embodiment of the present invention.

FIG. 6 shows a multi-processor system 600 that may be used to implement the controller 510 of the data storage device 500 according to an embodiment of the present invention. The system 600 is similar to the system 100 in FIG. 1 and further comprises a media controller 610 and a buffer 620.

In one embodiment, when the controller 510 receives a read/write command from the host, the first and second processors 110 and 120 may produce an internal media access command structure that directs the media controller 610 to read the corresponding data from or write the corresponding data to a physical address in the storage media 520 based on the received host read/write command.

Operations of the system 600 for writing data to the storage media 520 will now be described according to an embodiment of the present invention.

In one embodiment, the controller 510 may receive a write command from a host to write data to a particular logical block address. The controller 510 may temporarily store the corresponding data from the host in the buffer 620. In this embodiment, data transferred between the storage media 520 and the host may go through the buffer 620. For ease of illustration, the host interface to the buffer 620 is not shown in FIG. 6.

The first and second processors 110 and 120 may then be used to produce an internal write command structure to execute the host write command. The internal write command structure directs the media controller 610 to retrieve the corresponding data from the buffer 620 and write the data to a physical address in the storage media 520. In one embodiment, the write command structure may comprise a plurality of fields including fields for a command type, a logical block address (LBA), a buffer address, a physical address, and/or other information. The command type may specify that the command structure is for a write, the LBA may identify the LBA from the host for the data, the buffer address may identify the location of the data in the buffer 620, and the physical address may identify the physical location where the data is to be written in the storage media 520. Although the write to the storage media 520 is initiated by the host in this example, it is to be appreciated that a write to the storage media 520 may also be initiated by internal operations in the storage device such as a garbage collection routine, a wear leveling routine, etc.

In this embodiment, the first processor 110 may first build the write command structure in the first memory 112. The first processor 110 may also fill certain fields in the write command structure. For example, the first processor 110 may insert the command type (write command) and the logical block address into the appropriate fields of the write command structure. When the write command structure is ready for further processing by the second processor 120, the first processor 110 may generate a DMA transfer request for the write command structure. The DMA transfer request may include the address of the write command structure in the first memory 112 and a pointer indicating which slot 210-1 to 210-10 in the second memory 122 to write the corresponding shared memory pointer.

The first processor 110 may then send the DMA transfer request to the shared memory subsystem 130 to initiate the DMA transfer. The DMA transfer unit 150 may then transfer the write command structure from the first memory 112 to the shared memory 132 based on the address in the DMA transfer request. While the DMA transfer unit 150 handles the transfer, the first processor 110 can build a next command structure.

Once the write command structure is in the shared memory 132, the DMA transfer unit 150 may write the corresponding shared memory pointer in the second memory 122. The shared memory pointer specifies the address of the command structure in the shared memory 132.

The second processor 120 may then retrieve the write command structure from the shared memory 132 based on the shared memory pointer. The second processor 120 may do this by reading the write command structure from the shared memory via the direct transfer unit 140 and writing the write command structure in the second memory 122. The second processor 120 may then update the write command structure.

For example, the second processor 120 may read the logical block address from the write command structure and determine a physical address in the storage media 520 where the data is to be written. In this example, the second processor 120 may determine the physical address based on the logical block address read from the write command structure and a logical-to-physical address translation table or algorithm. The second processor 120 may then insert the physical address into the appropriate field in the write command structure.

In addition, the second processor 120 may determine the buffer address of the corresponding data in the buffer 620 (e.g., dynamic random access memory (DRAM)). The second processor 120 may determine the buffer address from a mapping table mapping the logical block address of the data to the corresponding buffer address. The second processor 120 may then insert the buffer address into the appropriate field in the write command structure.

The second processor 120 may then write the update to the shared memory 132 via the direct transfer unit 140. The second processor 120 may write the entire updated write command structure to the shared memory 132 or write only the portion of the write command structure updated by the second processor 120 (e.g., fields of the write command structure updated by the second processor 120).

In one embodiment, after writing the update for the write command structure to the shared memory 132, the second processor 120 may send the shared memory pointer to the media controller 610 so that the media controller 610 can execute the write command structure. In this embodiment, the second processor 120 may write the shared memory pointer to a first-in-first-out (FIFO) queue in the media controller 610 via a slave port 615 of the media controller 610. Thus, the second processor 120 may write the update for the write command structure to the shared memory 132 and pass the shared memory pointer to the media controller 610.

In this embodiment, the media controller 610 receives the shared memory pointer after the corresponding the write command structure has been updated by the second processor 120. The shared memory pointer may be held in the FIFO with other shared memory pointers for other command structures. For each shared memory pointer in its FIFO, the media controller 610 may retrieve the corresponding command structure from the shared memory 132 and execute the retrieved command structure. In this embodiment, the media controller 610 may execute the command structures in the order in which the corresponding shared memory pointers are received in the FIFO.

When the media controller 610 is ready to execute the write command structure, the media controller 610 retrieve the write command structure from the shared memory 132 based on the corresponding shared memory pointer in its FIFO. The media controller 610 may retrieve the write command structure via a master port 617. After retrieving the write command structure, the media controller 610 may execute the write command structure by reading the corresponding data from the buffer 620 based on the buffer address in the write command structure and writing the data in the storage media 520 at the physical address specified by the write command structure.

Although operations of the system 600 were discussed above for an example of a write command structure, it is to be appreciated that the system may also be used to produce a read command structure in a similar fashion. For example, the read command structure may include fields specifying a physical address where the data is to be read from the storage media 520 and a buffer address where the data from the storage media 520 is to be temporarily stored in the buffer 620. In this example, the first processor 110 may build the read command structure in the first memory 112. The first processor 110 may then send a DMA transfer request to the shared memory subsystem 130 to initiate a DMA transfer of the read command structure from the first memory 112 to the shared memory 132. The shared memory subsystem 130 may then send the corresponding shared memory pointer to the second processor 120. The second processor 120 may then read the read command structure from the shared memory 132, update the read command structure (e.g., with a physical address and a buffer address) and write the update to the shared memory 132. The second processor 120 may then pass the shared memory pointer to the media controller 610. The media controller 610 may then retrieve the read command structure from the shared memory 132 based on the shared memory pointer and execute the read command structure.

Although embodiments of the present invention have been discussed using examples of write/read command structures, those skilled in the art will appreciate that embodiments of the present invention can be applied to other types of data structures including an erase command structure (e.g., specifying the erasure of a block in a non-volatile semiconductor memory), a file where different fields correspond to different types of information in the file, etc. Further, those skilled in the art will appreciate that more than two processors may be involved in processing a data structure. For example, the shared memory pointer may be passed by the shared memory subsystem 130 or the second processor 120 to a third processor. The third processor may then retrieve the data structure from the shared memory 132 and update certain fields in the data structure. Thus, embodiments of the present invention may be applied to a multi-processor system comprising any number of processors. Further, those skilled in the art will appreciate that the roles of the first processor 110 and the second processor 120 may be reversed. For example, for certain data structures, the second processor 120 may build the data structure in the second memory 122 and send a DMA transfer request to the shared memory subsystem 130 to transfer the data structure from the second memory 122 to the shared memory 132. The shared memory subsystem 130 may then send a shared memory pointer to the first processor 110 so that the first processor 110 can retrieve and update the data structure. Further, those skilled in the art will appreciate that more than one shared memory subsystem 130 according to embodiments of the present invention may be used in a multi-processor system.

The systems 100 and 600 may be implemented as a system on a chip (SOC), in which the processors 110 and 120 and the shared memory subsystem 130 are integrated on a chip. Alternatively, the system 100 may be implemented with two or more chips on a printed circuit board (PCB). Those skilled in the art will appreciate that the systems 100 and 600 may include any number of processors and components depending on the particular application of the systems.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A multi-processor system comprising:
a first processor;
a first memory coupled to the first processor;
a second processor; and
a shared memory subsystem including a shared memory and a data transfer unit;
wherein the first processor is configured to build a data structure in the first memory and to send a direct memory access (DMA) transfer request to the data transfer unit of the shared memory subsystem, the DMA transfer request including an address of the data structure in the first memory;
wherein the data transfer unit is configured to retrieve the data structure from the first memory based on the DMA transfer request, to store the data structure in the shared memory, and to send a shared memory pointer to the second processor indicating an address of the data structure in the shared memory.

2. The system of claim 1, wherein the data transfer unit is configured to send a done status to the first processor after the data structure is stored in the shared memory.

3. The system of claim 1, wherein, in response to receiving the shared memory pointer, the second processor is configured to read at least a portion of the data structure from the shared memory using the shared memory pointer, to generate an update for the data structure based on the read portion of the data structure, and to write the update in the shared memory.

4. The system of claim 1, wherein the first memory comprises a memory tightly coupled to the first processor.

5. The system of claim 1, wherein the data transfer unit is configured to retrieve the data structure from the first memory concurrently with the first processor building a next data structure.

6. The system of claim 1, wherein the first processor is configured to specify the address of the data structure in the shared memory by writing the DMA transfer request to an address that is based on the address of the data structure in the shared memory and an address offset.

7. The system of claim 1, further comprising a second memory coupled the second processor, wherein the DMA transfer request specifies a location in the second memory and the data transfer unit is configured to write the shared memory pointer at the location in the second memory specified by the DMA transfer request.

8. The system of claim 1, wherein the data structure comprises a media access command, and the first processor is configured to include a logical address in the media access command.

9. The system of claim 8, wherein, in response to receiving the shared memory pointer, the second processor is configured to read the logical address in the media access command from the shared memory, to determine a corresponding physical address in a storage media based on the logical address, and to write the physical address into the media access command in the shared memory.

10. The system of claim 9, further comprising a media controller, wherein, after the physical address has been written into the media access command in the shared memory, the second processor is configured to send the shared memory pointer to the media controller and the media controller is configured to retrieve the media access command from the shared memory based on the shared memory pointer and to transfer data between a buffer and the storage media based on the media access command.

11. The system of claim 10, wherein the storage media comprises a solid state memory.

12. The system of claim 10, wherein the storage media comprises a magnetic disk.

13. The system of claim 7, wherein the first processor is configured to maintain a producer pointer in the first memory, the producer pointer indicating a most recent data structure transferred from the first memory to the shared memory.

14. The system of claim 13, wherein the second processor is configured to maintain a consumer pointer in the second memory, the consumer pointer indicating a most recent data structure processed by the second processor.

15. The system of claim 14, wherein the first processor is configured to compare the producer pointer with the consumer pointer to determine whether space is available in the second memory to receive the shared memory pointer for the data structure.

16. A method for inter-processor communication in a multi-processor system, wherein the system comprises a first processor, a second processor and a shared memory subsystem comprising a shared memory and a data transfer unit, the method comprising:
building a data structure in a first memory coupled to the first processor using the first processor;
sending a direct access memory (DMA) transfer request from the first processor to the data transfer unit of the shared memory subsystem, the DMA transfer request including an address of the data structure in the first memory;
retrieving the data structure from the first memory based on the DMA transfer request using the data transfer unit;
storing the retrieved data structure in the shared memory; and
sending, from the data transfer unit, a shared memory pointer to the second processor indicating an address of the data structure in the shared memory.

17. The method of claim 16, further comprising sending a done status to the first processor after the data structure is stored in the shared memory.

18. The method of claim 16, further comprising:
reading at least a portion of the data structure from the shared memory using the shared memory pointer;
generating an update for the data structure based on the read portion of the data structure using the second processor; and
writing the update in the shared memory.

19. The method of claim 16, further comprising specifying the address of the data structure in the shared memory by writing the DMA transfer request to an address based on the address of the data structure in the shared memory and an address offset.

20. The method of claim 16, wherein the data structure comprises a media access command including a logical address.

21. The method of claim 20, further comprising:
reading the logical address in the media access command from the shared memory;
determining a corresponding physical address in a storage media based on the read logical address using the second processor; and
writing the physical address into the media access command in the shared memory.

22. The method of claim 21, further comprising:
after the physical address has been written into the media access command in the shared memory, reading the media access command from the shared memory; and
transferring data between a buffer and a storage media based on the media access command.

23. The method of claim 22, wherein the storage media comprises a solid state memory.

24. The method of claim 22, wherein the storage media comprises a magnetic disk.

\* \* \* \* \*